United States Patent Office 2,698,673
Patented Jan. 4, 1955

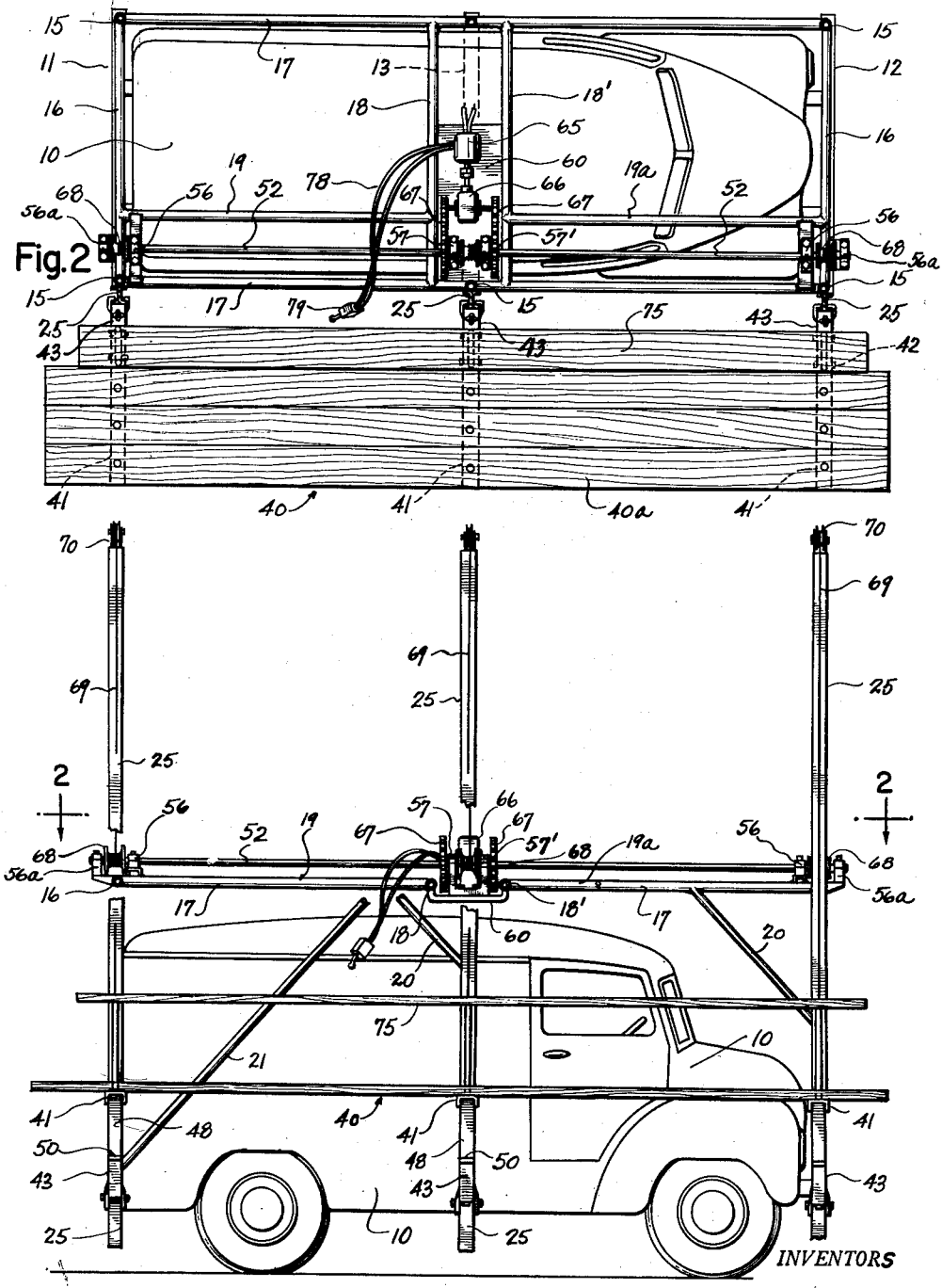

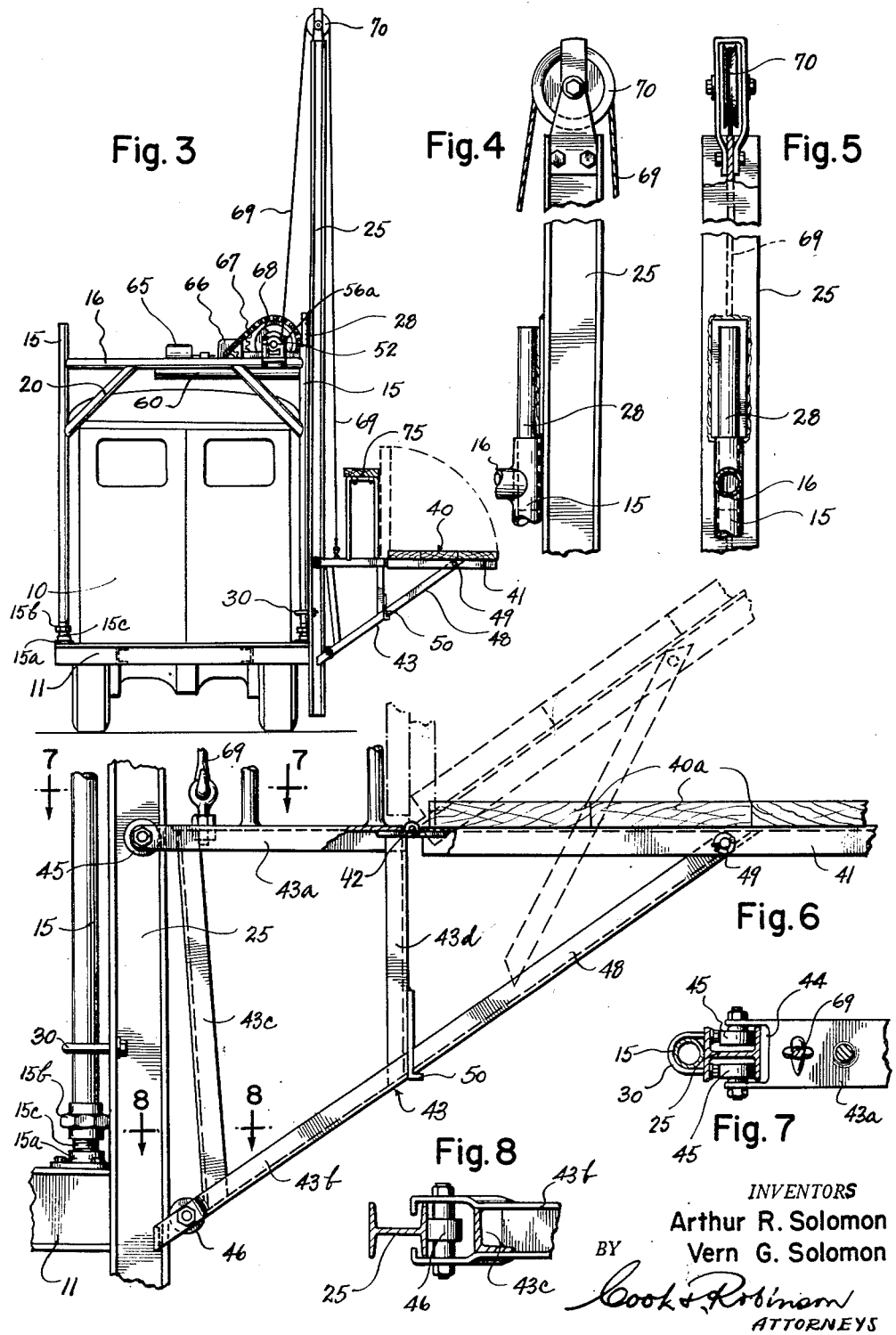

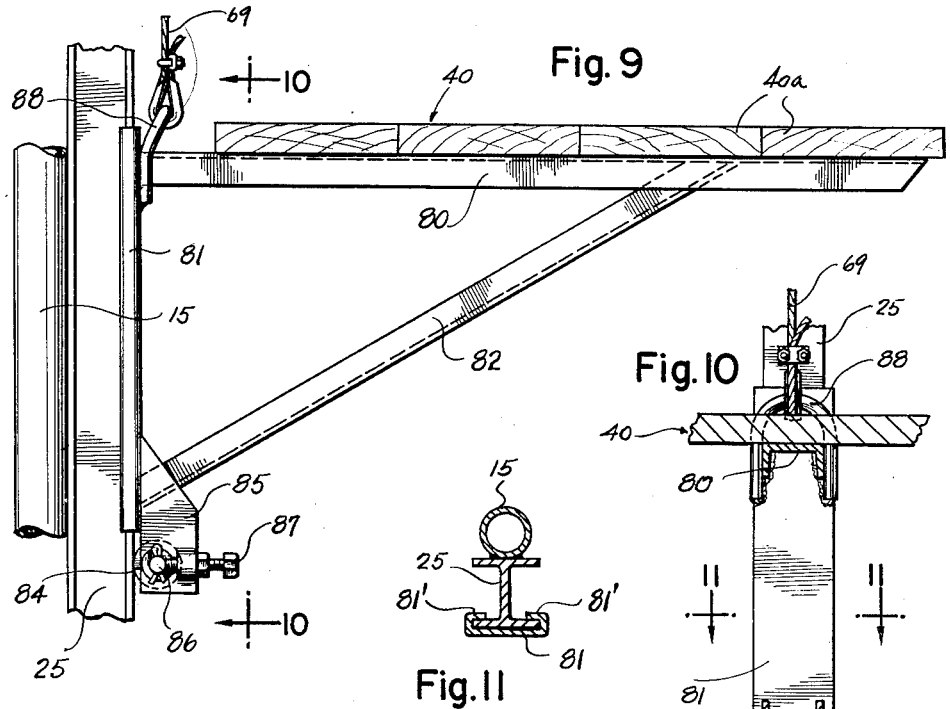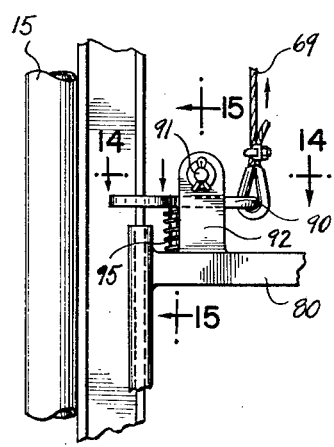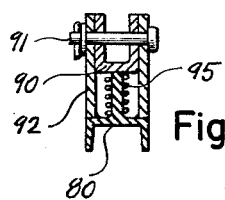

2,698,673

MOBILE STAGING

Arthur R. Solomon and Vern G. Solomon, Seattle, Wash.

Application September 4, 1953, Serial No. 378,646

3 Claims. (Cl. 187—11)

This invention relates to scaffolds. More particularly, it has reference to an improved portable scaffolding, designed to be removably affixed to and supported for use on a vehicle such as, for example, an ordinary automobile truck, tractor, trailer or other mobile equipment and to be moved, while erected, from one setting to another on a job and also to be moved from one job to another without having to be entirely dismantled or removed entirely from the supporting vehicle.

It is the principal object of this invention to provide a strong, durable, light weight scaffolding of the character above stated, that can be functionally applied to the selected supporting and transporting vehicle without requiring that any material alterations or additions be made to the frame or body construction of the vehicle; that can be so applied to the vehicle that it can be moved about on a job from setting to setting while fully erected; that embodies as a part thereof, a work platform that can be raised and lowered to any desired working level between the upper and lower limits which the construction provides for, and which is equipped with an electric motor for speedily making adjustments to any desired or required working elevation of the platform.

It is also an object of the present invention to provide a scaffold as above recited, having a main supporting frame structure that is designed to be removably affixed to frame of the moving and supporting vehicle, and to which main frame structure, vertical guide rails for mounting a work platform are removably applied and on which rails brackets for support of a work platform are adapted for vertical adjustment and are movable to elevate or lower the platform to various working levels by a motor driven mechanism that is controlled from the work platform.

Yet another object is to provide the scaffold with a safety holding or locking mechanism that operates automatically to prevent any possible dropping of the work platform in the event of the failure of its supporting and lifting cables.

Still further objects and advantages of the present invention reside in the details of construction of the various parts of the structure, in their combination and in the mode of operation of the apparatus, as will hereinafter be fully described.

In accomplishing the above mentioned and other objects of the invention, we have provided the improved details of construction, the preferred forms of which are illustrated in the accompanying drawings, wherein:

Fig. 1 is a side view of a scaffold embodied by the present invention, shown as functionally applied to a motor vehicle; certain parts of the structure being broken away for a showing of parts otherwise hidden thereby.

Fig. 2 is a horizontal sectional view of the scaffold as applied to the supporting vehicle, the view taken on line 2—2 in Fig. 1.

Fig. 3 is an end elevation of the scaffold as applied for use to the supporting and moving vehicle.

Fig. 4 is a view, showing in elevation, the upper end portion of one of the guide rails employed for mounting the platform supporting brackets, and the means for and manner of supporting the rail from the main frame structure.

Fig. 5 is an inner face view of the rail and parts thereon as shown in Fig. 4.

Fig. 6 is an end elevation of the work platform showing one of its supporting brackets as applied for vertical travel along a supporting and guiding rail.

Fig. 7 is a horizontal section, taken on line 7—7 in Fig. 6.

Fig. 8 is a horizontal section, taken on line 8—8 in Fig. 6.

Fig. 9 is an end view of the work platform showing a supporting bracket therefor of an alternative form of construction.

Fig. 10 is a vertical section, taken on line 10—10 in Fig. 9.

Fig. 11 is a horizontal section taken on line 11—11 in Fig. 10.

Fig. 12 is a horizontal section, taken on line 12—12 in Fig. 10.

Fig. 13 is a side view of a safety lock as applied to a member of the platform supporting bracket.

Fig. 14 is a horizontal section, taken on line 14—14 in Fig. 13.

Fig. 15 is a vertical section, taken on line 15—15 in Fig. 13.

Referring more in detail to the drawings:

In its present preferred form of construction, the scaffolding of this invention comprises a main frame structure that is designed to be rigidly but removably secured to the chassis or frame structure of the selected supporting and moving vehicle; a plurality of vertically disposed guide rails that are removably fixed to the said main frame structure along one side of the vehicle; brackets that are mounted on and supported for vertical adjustment along said rails, a work platform supported on the brackets and a motor driven cable-winding gear and cables extended therefrom to the brackets, whereby the work platform can be raised, lowered and held at different working elevations along the said rails; this entire scaffolding being movable, as a unit, in assembled condition.

In Figs. 1, 2 and 3, a supporting motor vehicle, of closed body truck form, has been designated in its entirety by reference numeral 10, and to this vehicle the main frame structure of the present scaffolding is rigidly but removably attached. This main frame structure comprises horizontal cross-beams 11 and 12 at its opposite ends; these preferably being of angle iron form, and welded, bolted or otherwise secured to the forward and rearward ends of the vehicle chassis or frame structure. Preferably the mounting and securing of these beams is made by first removing the bumpers from the vehicle and then bolting the cross-beams 11–12 to the usually provided bumper brackets. However, other ways of effecting the desired rigid fixation of these beams to the vehicle can be employed.

The cross-beams 11–12 extend slightly beyond opposite sides of the motor vehicle 10, as shown in Fig. 3, and a cross-beam 13, similar to the beams 11 and 12, is transversely fixed to the vehicle chassis midway of its ends; such a beam being indicated at 13 in Fig. 2. This beam is supported at the same level as beams 11 and 12 and likewise extends to opposite sides of the vehicle frame.

Erected upon and affixed to the opposite end portions of the cross-beams 11, 12 and 13 are vertical posts 15 of the main frame structure, each of which extends to the same level above the top of the vehicle. To join the posts to the cross-beams, we employ pipe flanges 15a bolted or welded to the beams and unions 15b are threaded onto the lower end of the posts and onto nipples 15c extending from the flanges. The posts are joined across their upper ends by the transverse, horizontal bars 16. Also, the upper ends of the three posts 15 that are in alignment along opposite sides of the vehicle are joined by longitudinally extending bars 16 and 17, and these bars, in turn, are joined across the medial portion of the structure by two horizontal cross bars 18—18' as best shown in Fig. 2. To add rigidity and for supporting various parts, we also employ the longitudinal bars 19 and 19a which are secured at their opposite ends to the bars 16 and 18—18'. All of these posts and bars are rigidly joined together and are suitably braced at ends of the frame by diagonal corner ties as at 20, in Fig. 3 and by the longer diagonal bracing rods 21, at sides of the frame to give this main frame structure the rigidity and durability that is necessary for its present intended use.

It is to be explained further that the posts 15, as well as the various horizontal bars 16, 17 and 18 and diagonal members 20 and 21, are tubular, preferably metal pipe, and that, for a purpose presently explained, the upper ends of the various posts 15 be left open.

Detachably fixed to the main frame structure, at one side of the vehicle are vertical guide rails 25 for support of the work platform. Each of these guide rails is of I-beam form, as well as shown in Figs. 3, 6 and 7. Also, each beam is of such length that when applied to the main frame as in Fig. 3, it will extend from near ground level to a point well above the top of the truck. In apparatus presently being used, these guide rails 25 are about twenty four feet long. Welded to the inside face of each of the rails 25 is a supporting pin 28. It is best shown in Fig. 3 that each pin is fixed vertically to the rail, about midway between its ends and, in Fig. 4, it is shown that the pin is so welded along its upper end portion to a face of the rail that the lower end portion of the pin is spaced away from the rail surface. The pins of these three rails 25 are projected downwardly into the open upper ends of the three tubular posts 15 at the same side of the vehicle and thus the rails 25 will be functionally supported with their lower ends a few inches above ground level. It is not shown in the drawing but if required, detachable brace members and tie bars may be employed to add rigidity and stability to the rails at their upper ends.

Each rail 25 also is secured, at some distance below its supporting pin 28, by means of a U-bolt 30 to the supporting post, as seen in Figs. 6 and 7; the U-bolts 30 being anchored in the inner flange of the secured beam. Thus, each rail 25 when so applied will be held rigidly in upright position. The three rails, serving together, provide a vertical trackway whereby the work platform of the scaffold can be supported and guided in its vertical adjustments as presently explained.

The work platform is herein designated generally by numeral 40, and it is shown in Figs. 2 and 6 to comprise a plurality of blanks 40a that are laid edge to edge and fixed upon horizontal supporting beams 41 which, in turn, are joined at their inner ends by hinges 42 to brackets, designated in their entireties by numeral 43, which are vertically adjustable along the guide rails 25.

Referring more particularly to Figs. 2, 3 and 6, it will be observed that the brackets 43 are spaced in accordance with the spacing of the rails 25. Each bracket 43, as shown best in Fig. 6, comprises a horizontal top beam 43a, an upwardly and outwardly directed lower beam 43b, and substantially vertical members 43c and 43d that rigidly connect the inner and outer ends of the parts 43a and 43b. At its inner end, the beam 43a is recessed, as at 44 in Fig. 7 and mounts a pair of rollers 45—45 therein in coaxial alignment. These rollers engage in rolling contact with the inner surfaces of longitudinal flanges of the guide rail 25 with which the bracket is associated. Likewise, the members 43b at their lower ends, mount rollers 46 that engage in rolling contact with the outer surfaces of the beams 25 as is well shown in Fig. 8. Thus, each bracket 34 is mounted for vertical, guided travel on the corresponding guide rail 25.

The horizontal beams 41 which support the planks of the platform 40, as hingedly attached to the outer ends of the bracket members 43a by the hinges 24, are horizontally supported by brace bars 48 that have pivotal connection at their outer ends, as at 49, with the beams 41 near their outer ends, and at their inner lower ends engage in holding and supporting contact with flanges 50 that are fixed horizontally to the lower ends of bracket parts 43d. The manner of hingedly mounting the beams 41 permits them to be swung upwardly and inwardly as has been indicated by the dotted line showing of these parts in Fig. 6.

For the purpose of raising and lowering the platform 40 to a desired level or elevation within the limits provided for, we have provided the cable winding mechanism shown in Figs. 1 and 2 wherein 52 designates a line shaft that extends the full length of the main frame structure and which is rotatably supported near its opposite ends in two bearings 56—56 and 56a—56a, and medially of its ends is mounted to revolve in spaced supporting bearings 57 and 57'. The shaft 52 is located close to that side of the supporting frame at which the work platform is located and the bearings 56, 56a and 57 are fixed to top members of the main frame structure as shown in Figs. 1 and 2.

Supported by a hanger 60 that is fixed to and located between the cross bars 18—18', is an electric motor 65 provided with a driving connection with the shaft 52; this being provided through suitable reduction gears in a gear box designated at 66, and other gearing 67—67. Fixed on shaft 52, in alignment with the three platform supporting brackets 43 are cable winding drums 68, and wound thereon are cables 69 that extend upwardly from the drums, then over sheaves 70 at the upper ends of the guide rails 25, then downwardly, and are connected at their lower ends to the top rails 43a of the several brackets 43, as shown in Fig. 6. Thus, upon driving the electric motor in one direction, the platform will be moved upwardly. By reversing the direction of the motor, the platform will be lowered.

It is shown in Figs. 1, 2 and 3, that a work bench 75 is erected on the brackets 43 to serve as a material holding and cutting bench, or for other uses. With the main frame so constructed and attached to a motor vehicle in the manner described, it is possible to easily and readily apply the brackets 43 to the rails 25 and to then apply the rails to the main frames. The supporting cables 69 are then attached to the brackets. With this done, the platform supports 41 are attached by the hinges 42 to the brackets and the diagonal supports 48 applied to the flanges 50. The platform planks are then laid in place and secured, to complete the structure as shown in Fig. 3.

Materials may be loaded onto the platform while it is in a lowered position and then, the workmen ride the platform to the working level desired. The electric motor 65 can be controlled by a switch 79 at the end of a flexible extension cord as shown at 78 in Fig. 2, and this switch can be carried on the platform 40 so that a workman can control the raising and lowering actions of the platform.

It is not generally required that the platform 40 and rails 25 be detached from the main frame in changing setting on a job. However, if the equipment is to be moved to a different location, it may be desirable to detach the platform and remove the supporting rails 25 and brackets 40. Then these parts can be readily and easily reassembled at the new location.

In Fig. 10, we have shown an alternative form of platform mounting bracket of simplified form that does not provide for the upward hinging of the platform supporting beams. This bracket comprises a horizontal top beam 80, fixed at its inner end to a vertical guide bar 81. A diagonal strut 82 joins the lower end of bar 81 and the outer end of beam 80. The guide bar 81 has opposite edge hook-like portions 81', shown in Fig. 11, hooked about the edge flanges of rail 25 to slidably affix the bracket to the rail. A roller 84 is adjustably mounted in a bracket 85, attached to the lower end of bar 81, for rolling contact with the outer face of rail 25. The roller is mounted on a cross pin 86 that is supported in the bracket for movement toward or from the rail by means of adjusting bolts 87—87, as seen in Fig. 12. The bracket suspending and adjusting cable 69 is here attached to a lop 88 that is welded to the upper end of bar 81.

In Fig. 13, we have illustrated a safety lock that may be mounted on each bracket 43 to prevent accidental dropping of the platform in the event the cables should break. Each lock comprises a plate 90 that is pivotally supported between its ends, as at 91, in a mounting bracket 92 that is fixed on the bracket rail 43a. The plate extends horizontally and at its outer end has the platform supporting cable 69 attached thereto. At its inner end the bracket is transversely slotted, as at 94 in Fig. 14, to slidably contain the adjacent vertical flange 25x of the rail 25 therein. A coiled spring 95 bears upwardly against the inner end of the plate to urge it toward gripping position. In the event that the supporting cable should break, the plate will be caused to grip the rail flange 25x and prevent drop of the platform.

Scaffolding of this kind is light in weight, is easy to apply to a truck or the like, and can be readily moved from setting to setting on a job without dismantling. For movement between jobs, the platform can be readily detached, and the beams 25 dismantled and if desired, the entire main frame can be completely removed from the vehicle in a relatively short period of time.

Having thus described my invention, what I claim as new therein and desire to secure by Letters Patent is:

1. In a scaffold of the character described, a base frame structure adapted for fixed mounting upon a motor vehicle, said base frame structure comprising upright posts arranged in alignment and in spaced relationship to each other at each side of the frame structure, vertical guide rails corresponding to the said posts, each rail being equipped with a supporting member fixed thereto and adapted for securement to the upper end of the corresponding post, means for fixing the lower end portion of the guide rails to the lower end portion of said post, a bracket extended horizontally from each rail, a work platform supported on said brackets, and means on the said base frame structure for raising and lowering the brackets along said rails.

2. In combination, a mobile road vehicle and a scaffold mounted thereon along a side thereof for movement therewith from setting to setting; said scaffold comprising a base frame structure fixed to said vehicle, one side portion of the frame including a plurality of upright guide rails detachably fixed to the said side portion of said base frame structure in alignment and in spaced relationship to each other and extending vertically the full height of the vehicle and projecting upwardly from said vehicle, a bracket slidably mounted on each of said rails for vertical adjustment therealong, a work platform extending along the frame between front and rear ends of the vehicle and supported upon said brackets, cable winding drums associated with the guide rails, sheaves at the upper ends of the said guide rails, cables wound on said drums and extended therefrom over said sheaves and downwardly to said brackets for their support and movement thereof along the said guide rails to vertically adjusted positions, and means for rotating said drums to raise and lower the brackets.

3. In combination, a mobile road vehicle and a scaffold mounted thereon for movement therewith from setting to setting; said scaffold comprising a base frame structure that is mounted on the vehicle and which comprises a plurality of vertical posts disposed in spaced relationship to each other along a side of said vehicle, vertical guide rails removably fixed to companion ones of said vertical posts and extending substantially above the vehicle and upper ends of the posts, a horizontally extending bracket mounted on each of said guide rails and extending laterally therefrom outwardly of the vehicle, said brackets being movable upwardly and downwardly along the guide rails, a work platform mounted on said brackets and extending substantially the full length of the vehicle, cable winding drums associated with the guide rails, sheave wheels mounted at the upper ends of said rails, cables wound on drums and extending therefrom over said sheaves and thence downwardly to said brackets and secured thereto for their vertical adjustment; said brackets being removable from said rails, and said rails being removable from said vertical posts for the long haul transportation of the scaffold.

References Cited in the file of this patent

UNITED STATES PATENTS

| Number | Name | Date |
|---|---|---|
| 1,306,431 | Klemme | June 10, 1919 |
| 1,324,675 | Knigge | Dec. 9, 1919 |
| 1,853,085 | Scannell | Apr. 12, 1932 |
| 1,859,894 | Schiller | May 24, 1932 |
| 2,212,064 | Elliott | Aug. 20, 1940 |
| 2,236,019 | Thompson | Mar. 25, 1941 |
| 2,423,167 | Aune | July 1, 1947 |